US006459909B1

(12) United States Patent
Bilcliff et al.

(10) Patent No.: US 6,459,909 B1
(45) Date of Patent: Oct. 1, 2002

(54) DISTRIBUTED CELLULAR TELEPHONE ANTENNA SYSTEM WITH ADAPTIVE CELL CONFIGURATION

(75) Inventors: Neil Bilcliff, Swindon (GB); Neil W A Turner, Devizes (GB)

(73) Assignee: Motorola, Inc., Schaumburg, IL (US)

( * ) Notice: Subject to any disclaimer, the term of this patent is extended or adjusted under 35 U.S.C. 154(b) by 217 days.

(21) Appl. No.: 09/586,460

(22) Filed: Jun. 3, 2000

(30) Foreign Application Priority Data

Feb. 12, 2000 (GB) .............................................. 0003174

(51) Int. Cl.⁷ ................................................ H04B 1/33
(52) U.S. Cl. ...................... 455/562; 455/18; 455/276.1; 455/446; 342/375; 343/844; 343/853
(58) Field of Search ......................... 455/279.1, 276.1, 455/560, 561, 67.1, 422, 562, 67.6, 272, 446, 18, 25, 129; 342/374, 375; 43/844, 853

(56) References Cited

U.S. PATENT DOCUMENTS

| 4,920,348 A | * | 4/1990 | Badghdady ................. 455/283 |
| 5,280,472 A | * | 1/1994 | Gilhousen et al. ........ 455/279.1 |
| 5,533,011 A | | 7/1996 | Dean et al. |
| 5,577,265 A | * | 11/1996 | Wheatley, III ........... 455/276.1 |
| 5,602,834 A | | 2/1997 | Dean et al. |

FOREIGN PATENT DOCUMENTS

| EP | 0 322 109 A2 | 6/1989 |
| EP | 0 967 682 A2 | 12/1999 |

OTHER PUBLICATIONS

Cook, B.R. "Novel Applications Of Radiating Feeder" Motorola Technical Developments, US, Motorola, Inc. Schaumburg, IL; vol. 17, Dec. 1, 1992, pp. 142–144, XP000329524.

* cited by examiner

Primary Examiner—Doris H. To

(57) ABSTRACT

A distributed antenna system for use in an in-building cellular telephone network, the system including a base transmission station (BTS), and a distributed antenna for conveying transmissions to and from the BTS, the distributed antenna including a plurality of serially-interconnected radiant segments, and at least one delay element intermediate two of the plurality of radiant segments, where the delay element is operative to introduce a delay in a transmission between the BTS and a mobile station (MS), where the BTS is operative to discern the delay in the transmission and thereby determine which of the plurality of radiant segments is closest to the MS and selectively radiate RF energy via the closest segment and prevent the radiation of RF energy via any other of the plurality of radiant segments.

13 Claims, 2 Drawing Sheets

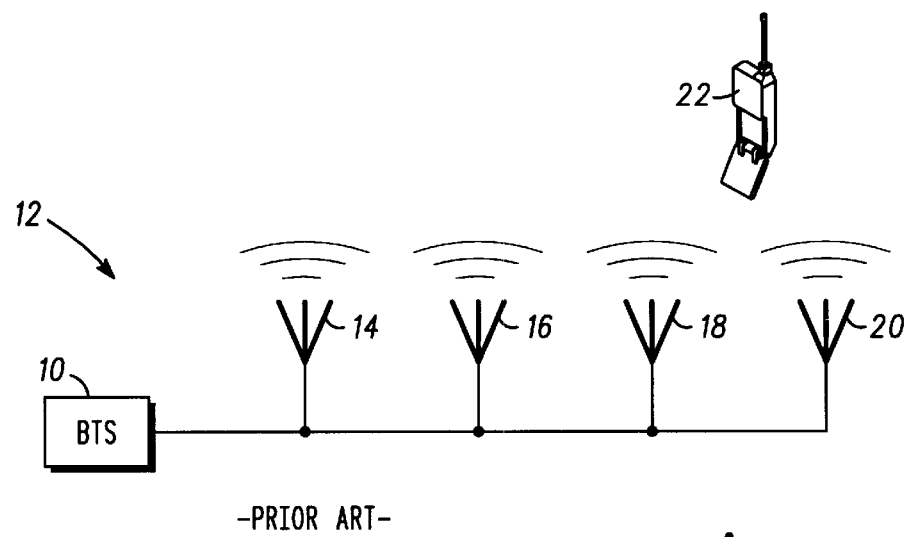
FIG. 1 -PRIOR ART-
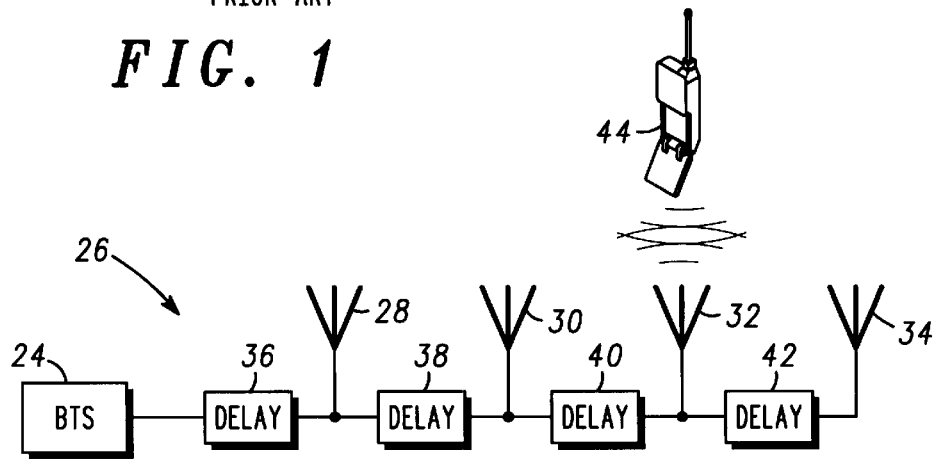
FIG. 2
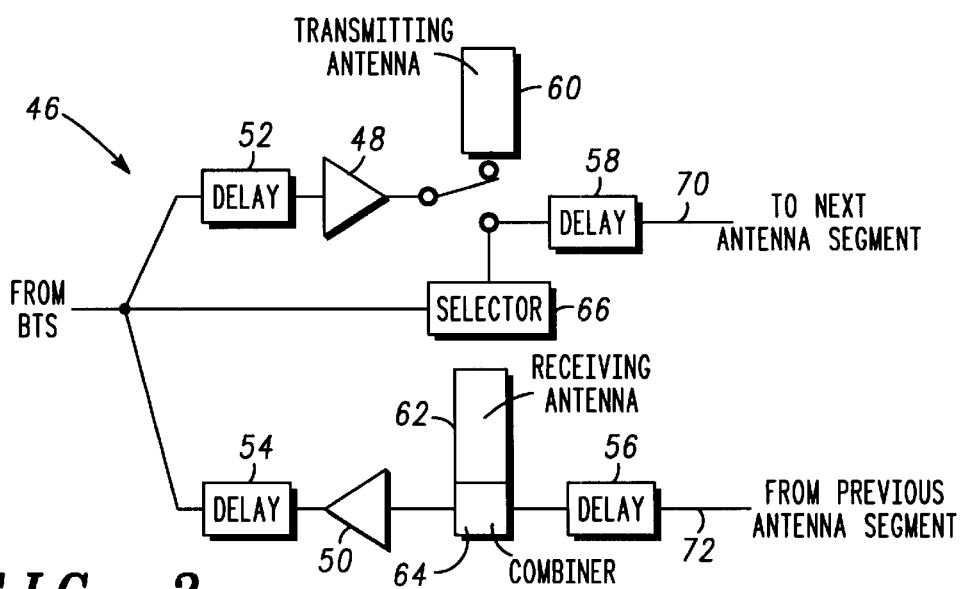
FIG. 3

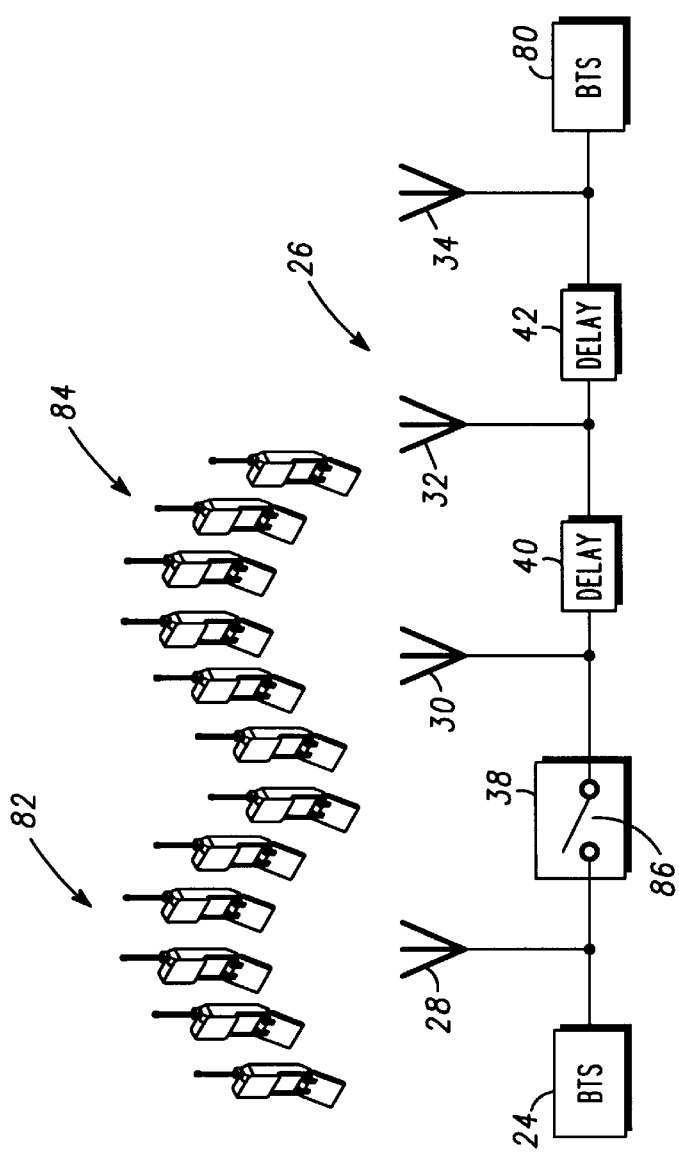
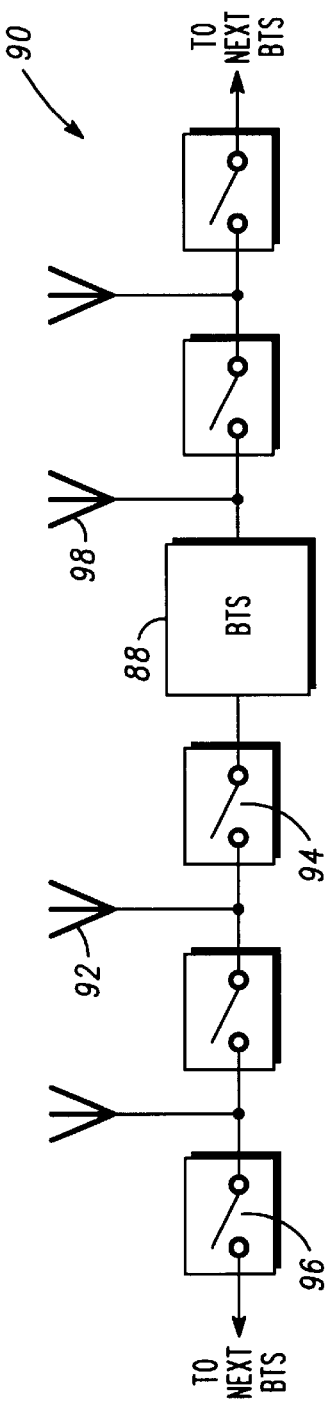
FIG. 4
FIG. 5

DISTRIBUTED CELLULAR TELEPHONE ANTENNA SYSTEM WITH ADAPTIVE CELL CONFIGURATION

FIELD OF THE INVENTION

The present invention relates to wireless communication systems in general, and more particularly to methods and apparatus for implementing a distributed antenna system in an in-building cellular telephone system.

BACKGROUND OF THE INVENTION

In-building cellular networks often require the use of multiple base transmission stations (BTS) located much closer together than outdoor BTSs. These in-building BTSs may employ a distributed antenna system where all segments radiate RF energy in order to provide coverage to mobile stations (MS). Such a prior art BTS arrangement is shown with respect to FIG. 1 which shows a BTS 10 having a distributed antenna 12 that is comprised of multiple radiant segments 14, 16, 18, and 20. Segments 14–20 typically transmit with equal power to an MS 22. Unfortunately, such an arrangement is inefficient as radiant segments 14, 16, and 20 that are farther from MS 22 radiate with equal power as segment 18 which is closest to MS 22.

BTS 10 is also prone to interference with and from other BTSs operating on the same frequency and at sufficient power that MSs receive more than one co-channel signal at the same time, thus limiting frequency reuse and network capacity. One way of overcoming this interference is by reducing the power transmitted by the BTSs. Unfortunately, reducing the transmission power also reduces the signal strength received by the MSs being served.

SUMMARY OF THE INVENTION

The present invention seeks to provide improved methods and apparatus for implementing a distributed antenna system in an in-building cellular telephone system in a manner that overcomes disadvantages of the prior art. The present invention discloses localizing RF power between an MS and the antenna segment to which it is closest, thereby improving network capacity by reducing interference between BTSs.

There is thus provided in accordance with a preferred embodiment of the present invention a distributed antenna system for use in an in-building cellular telephone network, the system including a base transmission station (BTS), and a distributed antenna for conveying transmissions to and from the BTS, the distributed antenna including a plurality of serially-interconnected radiant segments, and at least one delay element intermediate two of the plurality of radiant segments, where the delay element is operative to introduce a delay in a transmission between the BTS and a mobile station (MS), where the BTS is operative to discern the delay in the transmission and thereby determine which of the plurality of radiant segments is closest to the MS and selectively radiate RF energy via the closest segment and prevent the radiation of RF energy via any other of the plurality of radiant segments.

Further in accordance with a preferred embodiment of the present invention at least one delay element includes a plurality of delay elements and at least one of the plurality of delay elements is intermediate every two of the plurality of radiant segments.

Still further in accordance with a preferred embodiment of the present invention the BTS is additionally operative to instruct the MS to transmit in accordance with a timing advance in proportion to the delay.

Additionally in accordance with a preferred embodiment of the present invention the delay is sufficient to require the timing advance.

Moreover in accordance with a preferred embodiment of the present invention the delay is sufficient to cause a round trip delay that is greater than or equal to at least one step of the BTS equalizer timing resolution.

Further in accordance with a preferred embodiment of the present invention the delay element includes a transmission channel including at least one first delay component for receiving a transmission signal from a BTS, a first amplifier for receiving the transmission signal from the delay component, a first antenna for receiving the transmission signal from the first amplifier, and a switch for selectably controlling the receipt of the transmission signal at the antenna, a reception channel including a second antenna for receiving a reception signal, a power combiner for combining the reception signal and at least one other reception signal received via an third antenna, a second amplifier for receiving the reception signal from the power combiner, and at least one second delay component for receiving the reception signal from the second amplifier, and an antenna selector for selectably controlling the switch.

There is also provided in accordance with a preferred embodiment of the present invention a method for implementing a distributed antenna system in an in-building cellular telephone system having a base transmission station (BTS) and a distributed antenna including a plurality of serially-interconnected radiant segments for conveying transmissions to and from the BTS, the method including the steps of introducing a delay in a transmission between the BTS and a mobile station (MS) for each traversal of the transmission via any of the plurality of serially-interconnected radiant segments, discerning the delay in the transmission, thereby determining which of the plurality of radiant segments is closest to the MS, and selectively radiating RF energy via the closest segment and preventing the radiation of RF energy via any other of the plurality of radiant segments.

There is additionally provided in accordance with a preferred embodiment of the present invention a distributed antenna system for use in an in-building cellular telephone network, the system including a first and a second base transmission station (BTS), and a distributed antenna for conveying transmissions to and from either of the BTSs, the distributed antenna including a plurality of serially-interconnected radiant segments, at least one delay element intermediate two of the plurality of radiant segments, the delay element operative to introduce a delay in a transmission between the BTS and a mobile station (MS), and at least one switch intermediate two of the plurality of radiant segments, the delay element operative to actuate the switch, thereby disconnecting at least one of the plurality of radiant segments from either one of the BTSs where the either of the BTSs are operative to discern the delay in the transmission and thereby determine which of the plurality of radiant segments is closest to the MS, determine which of the BTSs lacks the capacity to accommodate the MS, and cause the delay element to actuate the switch thereby disconnecting the closest segment from the BTS lacking capacity.

Further in accordance with a preferred embodiment of the present invention either of the BTSs are operative to, if the BTS has capacity, selectively radiate RF energy via the closest segment and prevent the radiation of RF energy via any other of the plurality of radiant segments.

Still further in accordance with a preferred embodiment of the present invention at least one delay element includes a plurality of delay elements and at least one of the plurality of delay elements is intermediate every two of the plurality of radiant segments.

Additionally in accordance with a preferred embodiment of the present invention either of the BTSs is additionally operative to instruct the MS to transmit in accordance with a timing advance in proportion to the delay.

Moreover in accordance with a preferred embodiment of the present invention the delay is sufficient to require the timing advance.

Further in accordance with a preferred embodiment of the present invention the delay is sufficient to cause a round trip delay that is greater than or equal to at least one step of the BTS equalizer timing resolution.

Still further in accordance with a preferred embodiment of the present invention the delay element includes a transmission channel including at least one first delay component for receiving a transmission signal from a BTS, a first amplifier for receiving the transmission signal from the delay component, a first antenna for receiving the transmission signal from the first amplifier, and a switch for selectably controlling the receipt of the transmission signal at the antenna, a reception channel including a second antenna for receiving a reception signal, a power combiner for combining the reception signal and at least one other reception signal received via an third antenna, a second amplifier for receiving the reception signal from the power combiner, and at least one second delay component for receiving the reception signal from the second amplifier, and an antenna selector for selectably controlling the switch.

There is also provided in accordance with a preferred embodiment of the present invention a method for implementing a distributed antenna system in an in-building cellular telephone system having at least two base transmission stations (BTS) sharing an intermediate distributed antenna including a plurality of serially-interconnected radiant segments for conveying transmission to and from the BTSs, the method including the steps of introducing a delay in a transmission between either of the BTSs and a mobile station (MS) for each traversal of the transmission via any of the plurality of serially-interconnected radiant segments, discerning the delay in the transmission, thereby determining which of the plurality of radiant segments is closest to the MS, determining which of the BTSs lacks the capacity to accommodate the MS, and disconnecting the closest segment from the BTS lacking capacity.

It is noted throughout the specification and claims that the term "closest to" as regards the relationship between an MS and a radiant antenna segment as described hereinbelow refers the segment which receives the strongest signal from the MS and which may or may not be physically closest to the MS than other segments.

BRIEF DESCRIPTION OF THE DRAWINGS

The present invention will be understood and appreciated more fully from the following detailed description taken in conjunction with the appended drawings in which:

FIG. 1 is a simplified illustration of a prior art Base Transmission Station (BTS) in a cellular telephone network having a distributed antenna system;

FIG. 2 is a simplified illustration of a distributed antenna system for use in an in-building cellular telephone network constructed and operative in accordance with a preferred embodiment of the present invention;

FIG. 3 is a simplified illustration of a delay element 46, such as may be used for any of delay elements 36–42 of FIG. 2, constructed and operative in accordance with a preferred embodiment of the present invention;

FIG. 4 is a simplified illustration of multiple BTSs having a shared distributed antenna system, constructed and operative in accordance with a preferred embodiment of the present invention; and FIG. 5 is a simplified illustration of a shared distributed switched antenna system, constructed and operative in accordance with a preferred embodiment of the present invention.

DETAILED DESCRIPTION OF THE PRESENT INVENTION

Reference is now made to FIG. 2 which is a simplified illustration of a distributed antenna system for use in an in-building cellular telephone network constructed and operative in accordance with a preferred embodiment of the present invention. FIG. 2 shows a BTS 24 having a distributed antenna 26 that is compressed of multiple serially-interconnected radiant segments 28, 30, 32, and 34. Delay elements 36, 38, 40, and 42 are provided for to delay transmission to and/or reception from an MS 44 via segments 28, 30, 32 and 34 respectively.

In outdoor environments employing time division multiple access (TDMA) such as the Global System for Mobile Telecommunications (GSM) standard, a serving BTS tracks the round-trip delay of an MS it is serving so that as MS moves further away from BTS the BTS instructs the MS to transmit earlier in order to maintain time slot synchronization (i.e., the MS transmission always arrives at the BTS at the right time slot). The BTS does this by determining whether the transmission from the MS is arriving later or earlier than it should and instructs the MS to transmit earlier or later to compensate. The instruction to an MS to transmit earlier or later is typically referred to as a timing advance. In an in-building system, however, the BTSs are generally so close to the MSs that there is no timing problem (i.e., the MS transmission is never far enough away from the serving BTS that the MS transmission misses its time slot), and, therefore, no timing advance is required.

The use of delay elements 36–42 in FIG. 2 between segments 28–34 of distributed antenna 26 may be used to generate artificial delays in transmission and/or reception between BTS 24 and MS 44 and thereby necessitate the need for timing advances vis-a-vis transmissions from MS 44. The effect of the artificial delays is to make the segments of distributed antenna 26 behave as if they are farther apart from one another than they actually are. Thus, for example, a signal that is received from MS 44 at segment 32, incurs a delay factor of three as its signal is delayed by the three delay elements 36–40.

In order for the delay to be sufficient to require a timing advance, the round trip delay between BTS 24 and MS 44 must be greater than or equal to at least one step of the BTS equalizer's timing resolution. For GSM Digital Communication System at 1800 MHz the specified timing the round trip delay per step is equivalent to the maximum round trip distance divided by the speed of light in air divided by the number of steps of timing advance for maximum delay, or 70 km/$3\times10^8$ ms$^{-1}$/64 steps of timing advance =3.65 $\mu$s. This means that the delay introduced by delay elements 36–42 should be approximately 1.8 $\mu$s in each direction. Such a delay may be readily achieved by a device such as a SAW filter.

By introducing a minimum delay necessary to result in a timing advance, the segment of distributed antenna 26 that receives the strongest signal from MS 44 and which, by inference, is most likely closest to MS 44 than any other segment, may be determined. If the timing advance necessitated by the delay and calculated by the equalizer is zero, it must be segment 28. With each step of the timing advance, the segment closest (again, in signal strength, if not in distance) to MS 44 may be determined in term. Once the segment closest to MS 44 is determined, BTS 24 may send control signals multiplexed with the RF signal along distributed antenna 26 and cause the segment to selectively radiate, as is shown for segment 32 of FIG. 2. In this manner distributed antenna 26 selectively transmits signals to MS 44 from the closest antenna segment, thus reducing the overall power output in contrast to the prior art as shown in FIG. 1. It is appreciated that delay element 36 need not be present, wherein a signal received at BTS 24 having no delay would then be attributable to an MS being closest to segment 28.

Reference is now made to FIG. 3 which is a simplified illustration of a delay element 46, such as may be used for any of delay elements 36–42 of FIG. 2, constructed and operative in accordance with a preferred embodiment of the present invention. Delay element 46 may be used with a distributed duplex (simultaneous transmit and receive) antenna. Delay element 46 typically comprises amplifiers 48 and 50, delay components 52, 54, 56, and 58, a transmitting antenna 60, a receiving antenna 62 and a power combiner 64, an antenna selector 66, and a switch 68. Receiving antenna 62 and power combiner 64 effectively provide a summing junction at the specific antenna segment of signals received at other segments before it. Delay element 46 preferably provides each antenna segment with two adjoining delay components 52 and 58 on a transmitting channel 70, and two delay components 54 and 56 on a receiving channel 72.

Typical operation of the receiving and transmitting channels of delay element 46 is now described. Delay element 46 is preferably capable to selectively radiate a downlink signal on a specific timeslot while receiving uplink signals from all antenna segments at any time. With regard to signal reception, the BTS can determine which antenna segment is receiving the strongest signal from a given mobile station by use of the timing advance technique described hereinabove. In a cascaded series of antenna segments, delay element 46 is positioned between each antenna segment. In order for the BTS to receive signals from each antenna segment, the received signal passes from each antenna 62 to the power combiner 64 and then to the amplifier 50 and finally to the delay component 54, such as a SAW filter. The delay component 54 then feeds the signal into the power combiner and antenna of the next antenna segment and delay element on the way to the BTS. In this manner all the antenna segments provide a signal to the BTS which can distinguish between them, with the amplifiers provided to compensate for signal attenuation due to combiners, cables and delay elements.

The transmission side function is to selectively radiate the downlink signal under the control of the BTS. Typically, only one antenna segment will be used to radiate the signal. The architecture of FIG. 3 provides for antenna selector 66 which allows the signal to either be switched to the antenna segment for radiation or be switched to allow the signal to pass through the next delay element on to the next antenna segment. Again, an amplifier is used to overcome attenuation due to cables and delay elements. The BTS can thus control which antenna segment radiates, and hence transmit through the antenna segment closest to the mobile station.

The receive path shown in FIG. 3 is preferably permanently enabled, whereas the transmit antenna is preferably switched in an required. Each of the band-ass filters may implement some or all the time delay required. While the use of multiple delay elements in the uplink and/or downlink paths would typically be lossy and would reduce the effectiveness of the adaptive antenna, this is compensated for through the use of the amplifiers shown in FIG. 3.

Reference is now made to FIG. 4 which is a simplified illustration of multiple BTSs having a shard distributed antenna system, constructed and operative in accordance with a preferred embodiment of the present invention. The system of FIG. 4 may be constructed in accordance with the system of FIGS. 2 and 3 as described hereinabove with the notable distinction that a second BTS 80 is shown sharing distributed antenna 26 with BTS 24 by means of a simple switching arrangement. In the system of FIG. 4 the closeness of MSs to segments 28–34 is determined using the techniques described hereinabove, and control of the MSs and the antenna segments is divided between BTS 24 and BTS 80 according to their capacity to handle calls. In the example shown, 6 MSs, generally referenced 82, are shown close to segment 28 and 6 MSs, generally referenced 84, are shown close to segment 30. Assuming that BTS 24 has a capacity of 6 MSs, BTS 24 may act as the serving BTS to MS group 82 yet has no capacity for MS group 84. BTS 24 may then send control signals multiplexed with the RF signal along distributed antenna 26 and cause delay element 38 to actuate a switch 86 to separate shared antenna segments 30–34 from BTS 24 and place them entirely under the control of BTS 80. BTS 80, assuming it has the capacity, may then act as the serving BTS to MS group 84. It is appreciated that switch 86 may be placed in any or all of delay elements 38–42.

Reference is now made to FIG. 5 which is a simplified illustration of a shared distributed switched antenna system, constructed and operative in accordance with a preferred embodiment of the present invention. The system of FIG. 5 shows a BTS 88 connected to a distributed antenna 90 having multiple antenna segments 92 and delay elements 94 having switches 96, all as described hereinabove with reference to FIGS. 2–4. In the system of FIG. 5, distributed antenna 90 is preferably shared among several BTSs in a bus or ring topology. A delay element is preferably introduced between BTS 88 and the nearest delay elements in order to add extra delay and thereby differentiate between time delay elements, and hence between antennas. In GSM systems a maximum of 64 steps of timing advance may be used, thus allowing for a relatively large number of BTSs to share a single distributed antenna. It is appreciated that delay element 92 may be placed between BTS 88 and segment 92 close to BTS 88, while no delay element is placed between BTS 88 and a segment 98 similarly close to BTS 88. In this manner a transmission received at BTS 88 and having no delay would be attributable to an MS being closest to segment 98, while a transmission having a delay factor of 1 would be attributable to an MS being closest to segment 92.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A distributed antenna system for use in an in-building cellular telephone network, the system comprising:
   a base transmission station (BTS);
   a distributed antenna for conveying transmission to and from said BTS, said distributed antenna comprising:
   a plurality of serially-interconnected radiant segments;
   at least one delay element intermediate two of said plurality of radiant segments, said delay element operative to introduce a delay in a transmission between said BTS and a mobile station (MS);
   wherein said BTS is operative to:
   discern said delay in said transmission and thereby determine which of said plurality of radiant segments is closest to said MS;
   selectively radiate RF energy via said closest segment and prevent the radiation of RF energy via any other of said plurality of radiant segments;
   and said delay element comprises:
   a transmission channel comprising:
   at least one first delay component for receiving a transmission signal from a BTS;
   a first amplifier for receiving said transmission signal from said delay component;
   a first antenna for receiving said transmission signal from said first amplifier; and
   a switch for selectably controlling the receipt of said transmission signal at said antenna;
   a reception channel comprising:
   a second antenna for receiving a reception signal;
   a power combiner for combining said reception signal and at least one other reception signal received via a third antenna;
   a second amplifier for receiving said reception signal from said power combiner;
   at least one second delay component for receiving said reception signal from said second amplifier; and
   an antenna selector for selectably controlling said switch.

2. A system according to claim 1 wherein said at least one delay element comprises a plurality of delay elements and wherein at least one of said plurality of delay elements is intermediate every two of said plurality of radiant segments.

3. A system according to claim 1 wherein said BTS is additionally operative to instruct said MS to transmit in accordance with a timing advance in proportion to said delay.

4. A system according to claim 1 wherein said delay is sufficient to require said timing advance.

5. A system according to claim 4 wherein said delay is sufficient to cause a round trip delay that is greater than or equal to at least one step of said BTS equalizer timing resolution.

6. A distributed antenna system for use in an in-building cellular telephone network, the system comprising:
   a first and a second base transmission station (BTS); and
   a distributed antenna for conveying transmissions to and from either of said BTSs (24,80), said distributed antenna comprising:
   a plurality of serially-interconnected radiant segments;
   at least one delay element intermediate two of said plurality of radiant segments, said delay element operative to introduce a delay in a transmission between said BTS and a mobile station (MS); and
   at least one switch intermediate two of said plurality of radiant segments, said delay element operative to actuate said switch, thereby disconnecting at least one of said plurality of radiant segments from either one of said BTSs
   wherein said either of said BTSs are operative to:
   discern said delay in said transmission and thereby determine which of said plurality of radiant segments is closest to said MS,
   determine which of said BTSs lacks the capacity to accommodate said MS, and
   cause said delay element to actuate said switch thereby disconnecting said closest segment from said BTS lacking capacity.

7. A system according to claim 6 wherein either of said BTSs are operative to, if said BTS has capacity, selectively radiate RF energy via said closest segment and prevent the radiation of RF energy via any other of said plurality of radiant segments.

8. A system according to claim 6 wherein said at least one delay element comprises a plurality of delay elements and wherein at least one of said plurality of delay elements is intermediate every two of said plurality of radiant segments.

9. A system according to claim 6 wherein either of said BTSs is additionally operative to instruct said MS to transmit in accordance with a timing advance in proportion to said delay.

10. A system according to claim 6 wherein said delay is sufficient to require said timing advance.

11. A system according to claim 10 wherein said delay is sufficient to cause a round trip delay that is greater than or equal to at least one step of said BTS equalizer timing resolution.

12. A system according to claim 6 wherein said delay element comprises:
   a transmission channel comprising:
   at least one first delay component for receiving a transmission signal from a BTS;
   a first amplifier for receiving said transmission signal from said delay component;
   a first antenna for receiving said transmission signal from said first amplifier; and
   a switch for selectably controlling the receipt of said transmission signal at said antenna;
   a reception channel comprising:
   a second antenna for receiving a reception signal;
   a power combiner for combining said reception signal and at least one other reception signal received via an third antenna;
   a second amplifier for receiving said reception signal from said power combiner; and
   at least one second delay component for receiving said reception signal from said second amplifier; and
   an antenna selector for selectably controlling said switch.

13. A method for implementing a distributed antenna system in an in-building cellular telephone system having at least two base transmission stations (BTS) sharing an intermediate distributed antenna including a plurality of serially-interconnected radiant segments for conveying transmissions to and from said BTSs, the method comprising the steps of:

introducing a delay in a transmission between either of said BTSs and a module station (MS) for each traversal of said transmission via any of said plurality of serially-interconnected radiant segments;

discerning said delay in said transmission, thereby determining which of said plurality of radiant segments is closest to said MS;

determining which of said BTSs lacks the capacity to accommodate said MS; and disconnecting said closest segment from said BTS lacking capacity.

* * * * *

UNITED STATES PATENT AND TRADEMARK OFFICE
CERTIFICATE OF CORRECTION

PATENT NO.    : 6,459,909 B1
DATED         : October 1, 2002
INVENTOR(S)   : Bilcliff et al.

It is certified that error appears in the above-identified patent and that said Letters Patent is hereby corrected as shown below:

<u>Column 9,</u>
Line 2, reads "module station", should be -- mobile station --.

Signed and Sealed this

Twenty-seventh Day of May, 2003

JAMES E. ROGAN
*Director of the United States Patent and Trademark Office*